United States Patent [19]

Pinkstaff

[11] 4,033,250

[45] July 5, 1977

[54] PNEUMATIC BUFFERING SYSTEM

[75] Inventor: Carlos Dean Pinkstaff, Chardon, Ohio

[73] Assignee: The Babcock & Wilcox Company, New York, N.Y.

[22] Filed: June 18, 1975

[21] Appl. No.: 587,943

[52] U.S. Cl. .......................... 100/53; 100/DIG. 18; 74/615; 91/165; 91/397; 91/405; 192/134; 92/82; 82/85 B; 72/425; 72/420; 83/397

[51] Int. Cl.$^2$ .................. B21D 43/00; B21J 13/08; F15B 15/22; F16P 1/00

[58] Field of Search ............................ 74/612–615; 91/399, 405, 415, 397, 404, 417 R, 22, 398, 23, 165; 100/53; 83/478, 397; 92/8, 82, 85 R, 85 B; 72/446, 448, 419, 361, 425, 443, 441; 192/129 B, 133, 149, 134

[56] References Cited

UNITED STATES PATENTS

| | | | |
|---|---|---|---|
| 2,612,951 | 10/1952 | Palmleaf | 92/85 B X |
| 2,780,204 | 2/1957 | Barley | 91/415 X |
| 3,149,536 | 9/1964 | Hewitt | 91/35 |
| 3,370,428 | 2/1968 | Van Deberg | 91/405 X |
| 3,479,924 | 11/1969 | Ferguson | 91/165 |
| 3,641,841 | 2/1972 | Komori | 83/397 X |
| 3,865,218 | 2/1975 | Jones | 192/129 B X |
| 3,904,416 | 9/1975 | Onoda | 91/35 X |
| 3,910,420 | 10/1975 | Rich | 72/425 X |
| 3,913,413 | 10/1975 | Walker | 192/134 X |
| 3,935,811 | 2/1976 | Lenz | 72/448 |

FOREIGN PATENTS OR APPLICATIONS

| | | | |
|---|---|---|---|
| 25,461 | 11/1966 | Japan | 91/404 |
| 653,137 | 5/1951 | United Kingdom | 192/134 |
| 800,223 | 8/1958 | United Kingdom | 192/134 |

Primary Examiner—C.W. Lanham
Assistant Examiner—D. M. Gurley
Attorney, Agent, or Firm—Vytas R. Matas; Joseph M. Maguire

[57] ABSTRACT

A pneumatically buffered drive system is provided which quickly moves a movable member, such as a press safety curtain or press bolster, a predetermined length in three sequential speed stages to prevent maximum acceleration from occurring at the end of the predetermined length. The movable member is coupled to a differential pressure piston which is initially pressurized on only one side of the piston to initiate movement. After traversing approximately half the predetermined length both sides of the piston are pressurized to decelerate the piston during the member movement for approximately the next third of the predetermined length. The remaining length is traversed with the decelerating pressure being vented to positively finish the motion along the predetermined path. In vertical moving members having significant mass such as press safety curtains, a higher pressure is used to decelerate the piston than the pressure used to drive the piston. The higher decelerating pressure is required to effectively compensate for the momentum of the accelerated vertical member.

6 Claims, 4 Drawing Figures

PNEUMATIC BUFFERING SYSTEM

BACKGROUND OF THE INVENTION

1. Field of the Invention

The present invention generally relates to control systems for moving a movable member under sequentially applied driving pressures and particularly to such control systems wherein the movement between end points is initially accelerated, then decelerated, and then again accelerated.

2. Description of the Prior Art

Prior art systems used to move movable members, such as machine safety curtains and press bolsters, between predetermined travel points involved driving the member under a constantly applied force during the length of its travel. This involved a constant acceleration of the movable member and produced shocks when the member was stopped at the end points of the travel length. To eliminate these shocks shock absorbers were added at the end points which were springs or hydraulic mechanisms. In either event the shock absorbers had to be carefully sized for the particular mass and speed of the movable member. Further, the shock absorbers tended to wear out and fail under the constant pounding from the movable member and required costly maintenance and replacement.

Some fluid power systems are known which mechanically or time-delay actuate flow control valves or restrictions in the system to throttle the driving device and decelerate the motion of the driven member. However, such devices are operated with incompressible fluids such as liquids and are not readily applied to compressible fluids such as air. Attempts to adapt such devices to compressible fluids causes non-uniform deceleration so that surging and even rebound at the end of driven member travel may result.

Examples of the forementioned devices may be found in U.S. Pat. Nos. 3,803,943; 3,264,942; 2,916,879 and the reader is referred thereto for further detail of structure and operation.

SUMMARY OF THE INVENTION

The present invention solves the mentioned problems associated with prior art devices and others by providing a control system which drives a movable member between end points under the sequential applicaton of a driving pressure for a first part of the travel, a driving and decelerating pressure for a second part of the travel, and only the driving pressure for the remaining part of the travel. This allows the movable member to be speedily moved between the end points while being sufficiently decelerated to obviate the need for any shock absorbers to be placed at the travel end points.

In a particular applicaton of the present invention to massive vertically movable members, such as machine safety curtains, the decelerating pressure used during the second part of the travel is greater than the driving pressure to effectively compensate for the momentum of the accelerated safety curtain. The sequential application of the driving and decelerating pressures is controlled by a reed switch which is actuated by a magnetic member to establish a control signal. The magnet and reed switch assembly is mounted to have the reed switch and magnet be relatively movable with the movement of the safety curtain to thereby sense when the safety curtain has traversed the first and second parts of its travel.

From the foregoing it will be seen that one aspect of the present invention is to provide a control system for quickly moving a movable member between end points without requiring shock absorbers at the end points.

Another aspect of the present invention is to provide a control system which will quickly move and decelerate a massive vertically movable member such as a machine safety curtain.

Yet another aspect of the present invention is to provide a control system for moving a movable member under the sequential application of driving and decelerating pressures.

These and other aspects of the present invention will be more fully understood after a review of the following description of the preferred embodiments and the associated drawings.

DESCRIPTION OF THE PREFERRED EMBODIMENT

Figure 1:
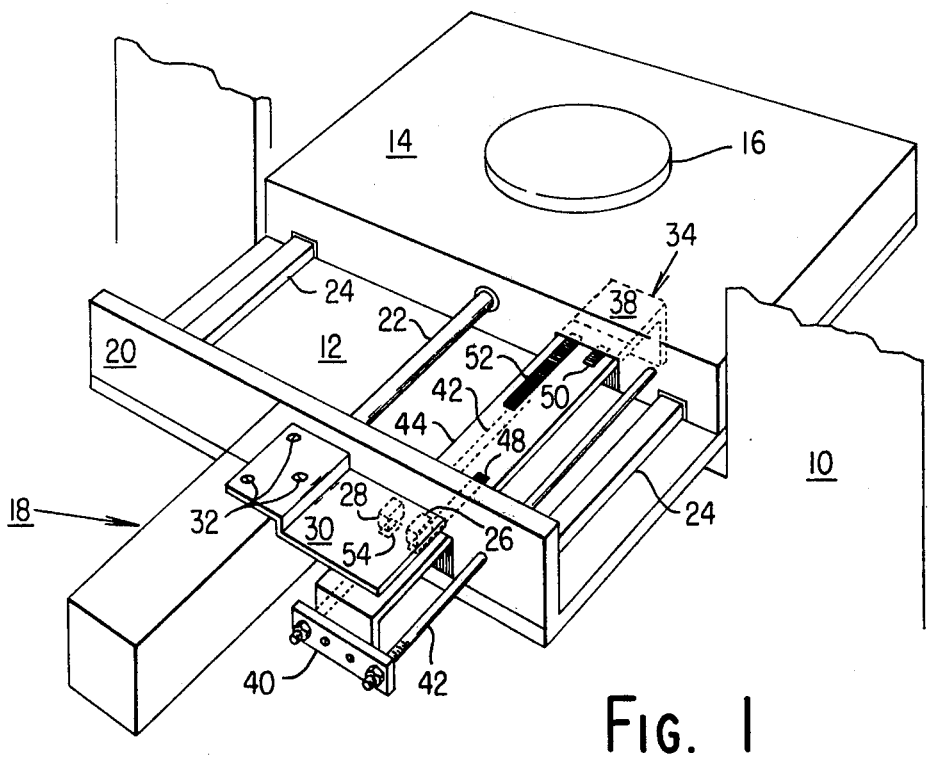
FIG. 1 is an isometric view of a press bolster utilizing the present invention.

Referring now to the drawings, FIG. 1 discloses a press assembly 10 having a frame member 12 along which a bolster 14 is moved from a first position, as shown in FIG. 1, out of the press assembly 10 to a second positon aligned with a ram (not shown) of the press assembly 10. In the out position a work-piece (not shown) is safely loaded on a die 16 mounted to the bolster 14. The workpiece carrying bolster 14 is then moved into the press 10 where the workpiece is formed by the die 16 and the bolster is again moved out with the finished workpiece.

The movement of the bolster 14 is affected by a pneumatic piston assembly 18 mounted to a stationary mounting frame 20 attached to the frame member 12. The piston assembly has a sealably movable piston (not shown) with a connecting rod 22 extending therefrom connected to the bolster 14. Actuation of the piston assembly either extends or withdraws the connecting rod 22 thereby moving the bolster 14 in and out of the press 10 along guides 24 mounted to the frame member 12.

To expedite production efficiency it is desirable to move the bolster in and out of the press 10 as quickly as possible. This would indicate that a continuous acceleration of the bolster 14 is needed. However, the bolster 14 must be safely stopped at the travel end points and shock absorbers were commonly used for such purposes. Because of the problems associated with such shock absorbers the present bolster 14 is pneumatically buffered at predetermined travel points to allow the bolster 14 to quickly move in and out of the press 10 without requiring shock absorbers at the travel end points.

Predetermined bolster 14 travel positions are detected by a pair of stationary reed switches 26, 28 mounted on a bracket 30 affixed to the piston assembly 18 by screws 32. The reed switches 26, 28 are actuated by magnets mounted on a magnet assembly 34 which is movable with the bolster 14. The magnets actuate the reed switches 26, 28 at different bolster 14 travel positions.

The magnet assembly 34 includes an elongated frame having one end 38 attached to the bolster 14 and another end 40 tied to the first end 38 by tension rods 42. An elongated mounting member 44 connects the two ends 38 and 40 along which the magnets are mounted to pass under the reed switches 26 and 28 as the magnet assembly 34 moves with the bolster.

Figure 2:
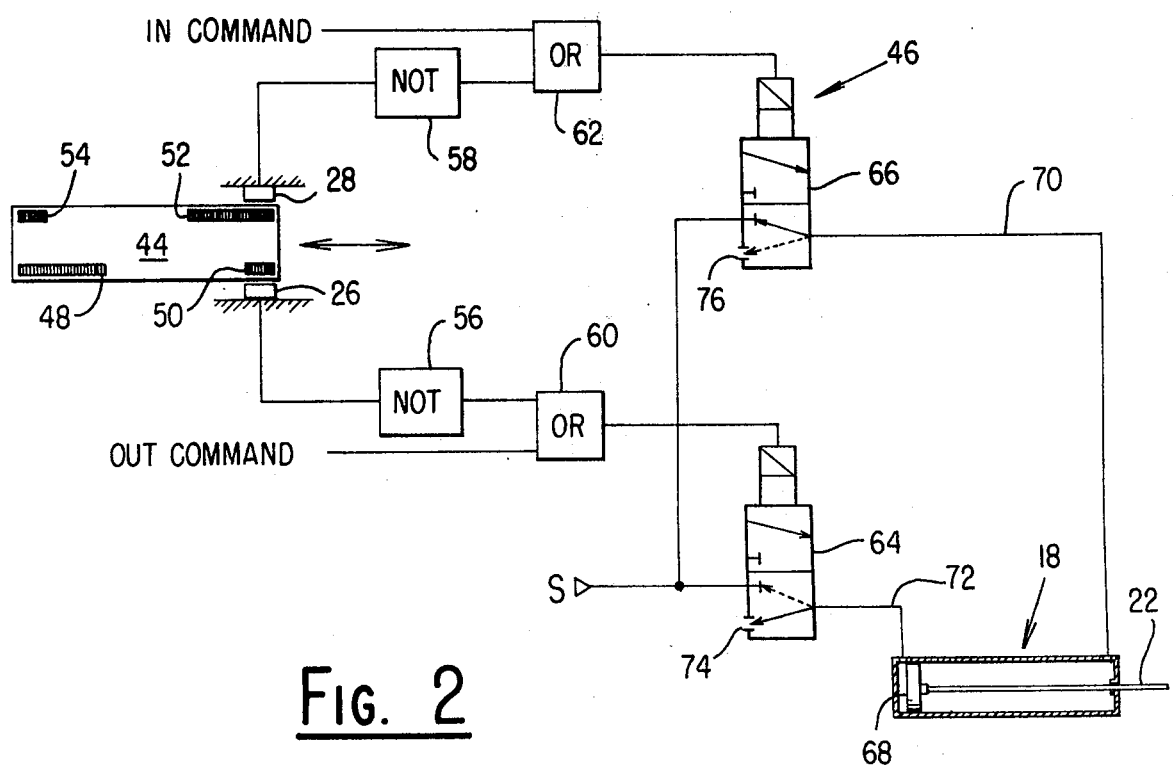
FIG. 2 is a schematic of the control system for the press bolster of FIG. 1.

Turning now to FIG. 2 it will be seen that the air buffering is synchronized to bolster 14 position by a control assembly 46 which sequentially drives and buffers the piston assembly 18 in response to the position of the magnets on the member 44 with respect to the reed switches 26 and 28. The member 44 has an elongated magnetic strip 48 and a short magnetic strip 50 mounted along one side of the member 44 to be movable under the reed switch 26 and an elongated magnetic strip 52 and a short magnetic strip 54 mounted along the opposite side of the member 44 to be movable under the reed switch 28.

The control assembly 46 includes a NOT gate 56 connected to the reed switch 26 and a NOT gate 58 connected to the reed switch 28. The NOT gates 56 and 58 invert the respective signals from the reed switches 26 and 28 and form one input to respective OR gates 60 and 62. The other inputs of the OR gates 60 and 62 are provided by respective command signals indicating that the bolster 14 is to be driven OUT Of the press 10 and IN to the press 10. The OR gates 60 and 62 are respectively connected to valves 64 and 66 which are switchable between a position supplying supply S pressure to the piston assembly 18 annd venting the piston assembly 18 in response to a control signal from the OR gates 60 and 62.

The piston assembly 18 is shown with piston 68 in a retracted positon with the bolster 14 in the press 10 and the end 38 of the mounting member 44 against the reed switches 26 and 28. The magnets 50 and 52 are actuating the reed switches 26 and 28 to provide 1 signals to the NOT gates 56 and 58. The NOT gates 56 and 58 are however inverting the 1 signals to provide 0 signals to the OR gates 60 and 62. Since the respective IN and OUT command signals are maintained until they are reset by the opposite signal, the 1 IN command actuates the OR gate 62 to provide a 1 control signal to the valve 66 causing it to provide supply S pressure along line 70 to one side of the piston 68. The lack of an OUT command to the OR gate 60 provides a second 0 signal to the OR gate 60 thereby maintaining a 0 control signal from the OR gate 60 to the valve 64. Without a 1 control signal to the valve 64 the opposite side of the piston 68 is vented along line 72 through an exhaust 74 of the valve 64. The piston 68 and bolster 14 are thereby maintained in the press 10.

When the 1 OUT command is given to the OR gate 60 the 1 IN command is reset to 0 with the 1 OUT command being continuous. The OUT command then establishes a 1 control signal to the valve 64 from OR gate 60 at the same time as the 1 control signal from the OR gate 62 changes to 0. The valve 64 now supplies supply S pressure through line 72 to the piston 68 while the valve 66 now exhausts the other side of the piston 68 along line 70 through an exhaust 76. The pressure difference across the piston 68 causes the piston to move the bolster 14 and the mounting member 44 out of the press 10. The valve 66 stays in the dotted line exhaust positon until the member 44 moves sufficiently, approximately 30% of travel, to prevent the magnetic strip 52 from actuating the reed switch 28. The reed switch then yields a 0 signal to the NOT gate 58 which inverts the 0 signal to a 1 signal to the input of the OR gate 62. The OR gate 62 now switches the valve 66 to the supply S pressure to line 70 to oppose the pressure supply provided to the piston 68 by the valve 64. This causes the bolster 14 to be decelerated while still moving out of the press for approximately the next 60% of travel. When the member 44 moves sufficiently to have the magnetic strip 54 actuate the reed switch 28 the valve 66 again switches to the dotted position to exhaust pressure from line 70 through the exhaust 76. Thus the bolster is positively driven the last 10% of travel by the pressure from valve 64. Since the OUT command is continuously maintained to the OR gate 60 throughout the 100% of travel the signal fluctuations from magnetic strips 48 and 50 actuating the reed switch 26 do not enter into maintaining the one side of the piston 68 pressurized through valve 64.

To move the bolster back out of the press 10 the previous procedure is reversed. The IN command resets the OUT command to 0 while maintaining the opposite side of the piston 68 pressurized through valve 66 throughout 100% of the travel of the bolster 14 and member 44 into the press 10. The magnetic strip 48 now maintains the valve 64 in the exhaust position for the first 30% of travel by actuating the reed switch 26. The next 60% of travel the valve 64 is switched to the dotted supply positon by the unactuated reed switch 26 to decelerate the piston 68 movement. The last 10% of travel the reed switch 26 is again actuated to switch the valve 64 back to the exhaust position and positively move the bolster 14 back in to the press 10.

Clearly different driving and decelerating valve positions could be easily provided by varying the lengths and positions of the mgnetic strips 48, 50, 52, and 54. It will also be appreciated that the above system is a pneumatic system and could be fitted with resistances to delay the venting and pressurizing of the piston assembly as desired to more effectively air buffer the piston 68.

Figure 3:
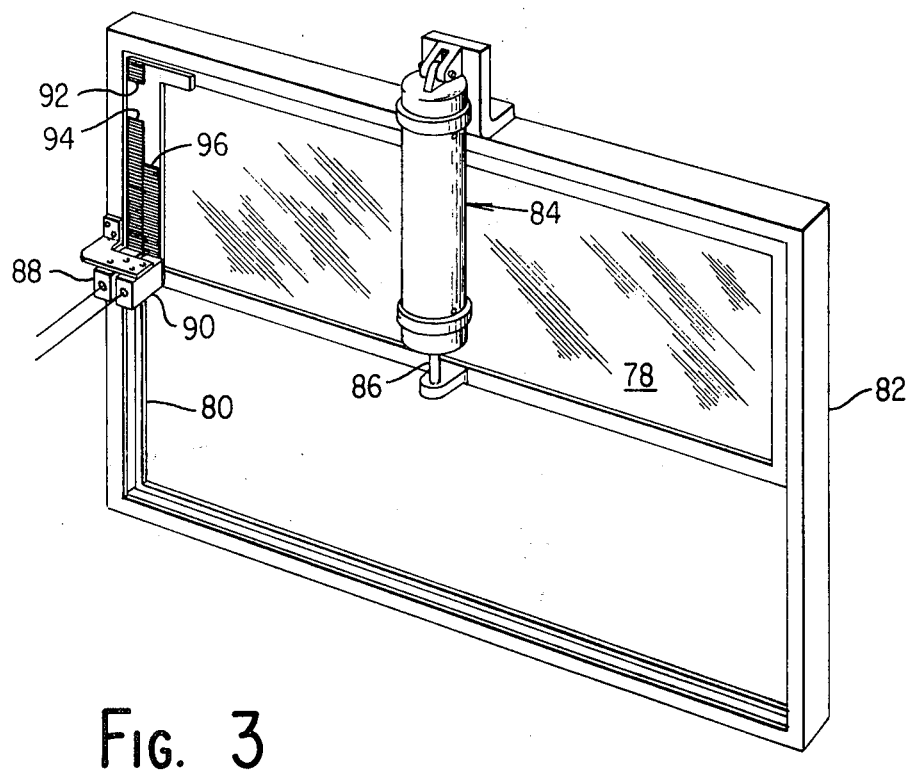
FIG. 3 is an isometric view of a machine safety curtain applied to utilizing the present invention.

Turning now to FIG. 3 it will be seen that air buffering may also be applied to vertically dropping safety screens or curtains used to prevent access to machinery such as a press during the working cycle of the machine. To accomplish this a curtain 78 is made to be vertically movable within guide slots 80 mounted to a frame 82. The movement of the curtain 78 is affected by a piston assembly 84 having a connecting member 86 connected to the curtain 78. The piston assembly is air buffered at predetermined curtain 78 positions which are sensed by a pair of reed switches 88 and 90 stationarily mounted to the frame 82. The position of the curtain 78 is signaled by a series of magnetic strips 92, 94 and 96 affixed to the curtain 78 to be movable therewith. Since such curtains 78 usually have a signficant mass buffering their closure is especially important to prevent them from closing too hard and destroying themselves.

Figure 4:
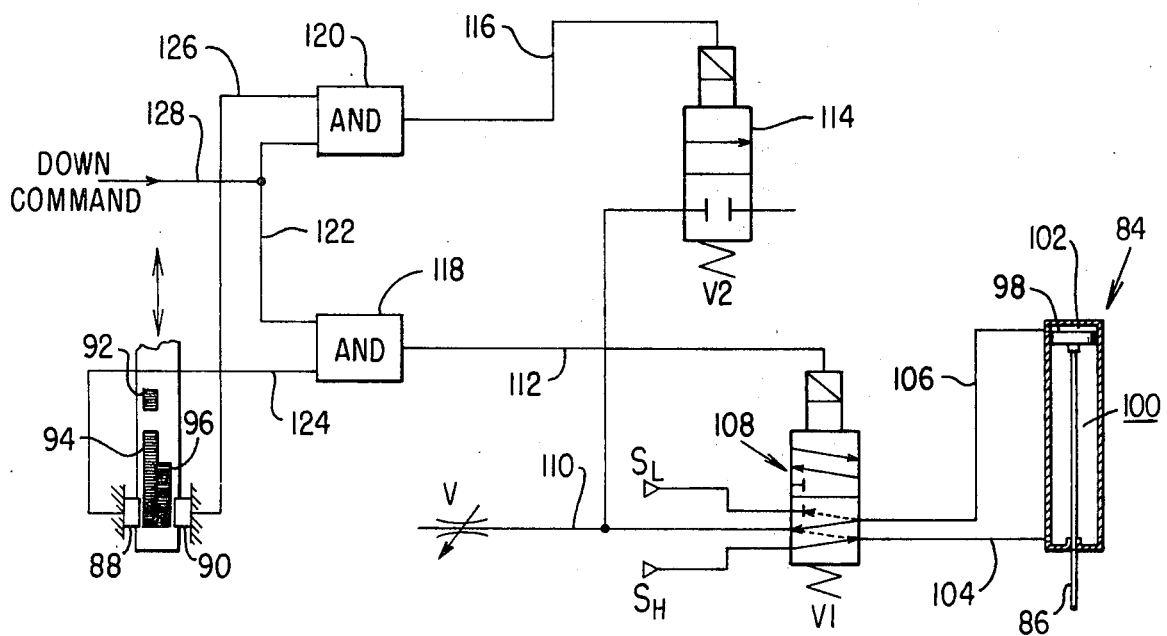
FIG. 4 is a schematic of the control system for the safety curtain of FIG. 3.

As may be best seen with reference to FIG. 4 the piston assembly 84 has a piston 98 which sealably forms two chambers 100 and 102 on opposite sides of the piston 98 which are respectively supplied by lines 104 and 106 extending from a four way valve assembly 108. As shown by the solid line positions of valve assembly 108 when there is no control signal to the valve 108 the chamber 102 is exhausted along a line 110 while the chamber 100 is supplied by a high pressure source $S_H$. This maintains the piston 98 in its upmost positon keeping the curtain 78 open. Whenever the valve assembly 108 receives a 1 control signal along line 112 the valve 108 switches to the dotted line positions exhausting chamber 100 to line 110 and supplying chamber 102 with pressure from a low pressure supply $S_L$.

The exhaust line 110 is connected to both a variable restrictor V and to a quick exhaust valve 114 which varies from a normally closed position to a quick exhaust position whenever a 1 control signal is applied to the valve 114 along line 116. This dual connection of line 110 provides either a slow controlled exhaust through the restrictor V when the valve 114 is closed or a substantially immediate exhaust through the valve 114 whenever it is actuated.

Control signals to vlaves 108 and 114 are supplied by respective AND gates 118 and 120 whenever all their inputs are 1. Since both AND gates 118 and 120 have a common DOWN command input by way of line 122 neither AND gate 118 or 120 will yield a 1 control signal until the DOWN 1 command is initiated even though both reed switches 88 and 90 are actuated by the magnetic strips 94 and 96 to provide 1 signals to the AND gates 118 and 120 along input lines 124 and 126.

When the 1 DOWN command is initiated along line 128 all the inputs of AND gates 118 and 120 become 1 and 1 control signals are established along lines 112 and 116 to valves 108 and 114. The chamber 100 is thus quickly exhausted by the valve 114 through lines 104 and 110 while the chamber 102 is supplied with pressure from $S_L$ by valve 108 along line 106. This causes the curtain 78 to start moving down to the closed position. This movement continues until the magnetic strip 96 passes under reed switch 90 and no longer actuates it. The open reed switch 90 causes the output of AND gate 120 to go to 0 and the valve 114 to close preventing further speedy exhausting of chamber 100 therethrough. The chamber 100 must now be exhausted through the restriction V. As the curtain 78 continues down the magnetic strip 94 passes under the reed switch 88 and it also opens causing the output of the AND gate 118 to go to 0. This causes the valve 108 to apply high pressure $S_H$ to chamber 100 while exhausting chamber 102 through the restriction V. The higher pressure $S_H$ is used to effectively brake the momentum of the curtain 76 and slow it down prior to closure. As the curtain continues down the magnetic strip 92 again actuates the reed switch 88 to close and the AND gate 118 to switch the valve 108 to its initial position venting chamber 100 and pressurizing chamber 102 to $S_L$. This positively closes the curtain 78.

Clearly the same foregoing procedure could be reversed to drive the curtain up. However it was found that because of the mass of the curtain 78 the curtain could be easily and safely driven up at a constantly applied pressure with the mass of the curtain 78 acting to mechanically buffer the upward motion.

Certain improvements and modifications will occur to those skilled in the art upon reading the foregoing. It will be understood that such improvements and modifications were deleted for the sake of conciseness and readability but that they are properly included in the scope of the following claims.

What I claim is:

1. A pneumatic system for controllably driving down a vertically raised press safety curtain to the end position of a predetermined vertical path comprising:

a first pneumatic pressure source having a first pressure level;
   a second pneumatic pressure source having a second pressure level higher than said first pressure level;
   a linear actuator having a pair of opposed pressure chambers;
   a piston movable in said linear actuator in response to the pressure difference in the opposed pressure chambers of said linear actuator, said piston being coupled to the press safety curtain to move the press safety curtain with movement of said piston;
   sensing means for detecting the position of the press safety curtain along the predetermined path and establishing control signals indicative thereof; and
   valve means responsive to the control signals of said sensing means for sequentially applying said first pressure level from said first pressure source to one of the opposed pressure chambers of said linear actuator to quickly drive the press safety curtain through a first downward part of the predetermined path, applying said second higher pressure level from said second pressure source to the other of the opposed pressure chambers of said linear actuator while exhausting pressure from said one pressure chamber to buffer the speed and momentum of the press safety curtain through a second part of the predetermined path and exhausting the other pressure chamber of said linear actuator to drive the press safety curtain through the remaining part of the predetermined path to quickly close it without causing a shock to the safety curtain and press.

2. A system as set forth in claim 1 wherein the press safety curtain is vertically movable along a frame mounted to the press between a first position allowing access through the frame and a second position preventing access through the frame and wherein said sensing means includes a magnet and a reed switch positioned along the frame and the safety curtain to be relatively movable with the frame and safety curtain to actuate the reed switch when the reed switch is moved into the magnetic field of the magnet.

3. A system as set forth in claim 2 wherein said valve means includes first valve means connected between said first pressure source and one of the pressure chambers of said linear actuator and second valve means connected between said second pressure source and the other of the pressure chambers of said linear actuator, said first and second valve means being switchable between a first condition applying pressure to one of the pair of chambers and a second condition exhausting one of the pair of chambers in response to the actuation of said reed switch by said magnet.

4. A system as set forth in claim 3 wherein said first and second valve means includes a four way valve connecting said first and second pressure sources to said pair of pressure chambers, said four way valve being responsive to the actuation of said reed switch to exhaust one of the pressure chambers when the other is being pressurized.

5. A system as set forth in claim 4 including a restriction connected to the exhaust of said four way valve and a normally closed quick exhaust valve connected to bypass said restriction whenever a control signal is applied thereto.

6. A system as set forth in claim 5 including a second magnet and reed switch mounted to the frame and the safety curtain to be relatively movable and establish said control signals to said exhaust valve along predetermined points on the predetermined path.

* * * * *